United States Patent [19]
Van Den Bosch

[11] 3,832,062

[45] Aug. 27, 1974

[54] SPECTROPHOTOMETRICAL APPARATUS FOR DETERMINING DOSING SUBSTANCES IN A LIQUID

[76] Inventor: Francois J. G. Van Den Bosch, 11 Hillcrest Rd., Cedar Grove, N.J. 07009

[22] Filed: Mar. 27, 1973

[21] Appl. No.: 345,354

[30] Foreign Application Priority Data
Mar. 29, 1972 Belgium .............................. 115738

[52] U.S. Cl. .................................... 356/97, 356/94
[51] Int. Cl. .............................................. G01j 3/42
[58] Field of Search ............... 356/51, 88, 89, 93–98

[56] References Cited
UNITED STATES PATENTS

| | | | |
|---|---|---|---|
| 3,459,479 | 8/1969 | Sundstrom et al. ............... | 356/97 X |
| 3,369,447 | 2/1968 | Gallaway et al. .................. | 356/96 |
| 3,734,621 | 5/1973 | Moody et al. ...................... | 356/95 |

*Primary Examiner*—John K. Corbin
*Assistant Examiner*—F. L. Evans
*Attorney, Agent, or Firm*—Watson, Cole, Grindle & Watson

[57] ABSTRACT

Spectrophotometric apparatus for determining substances present in a liquid by a visual indication or display of the differences between a spectrum of the liquid and a standard liquid. A spectrum of the liquid and a reference liquid is analyzed by scanning the band-width of luminous radiation from the ultraviolet to the near infra-red. The spectra are alternatively chopped and compared with a reference voltage. The output representing the difference between the spectra is obtained from an operational amplifier having a feedback circuit including a light generating element for generating a light output proportional to the difference between the spectral and a light sensitive element responsive to the light output of the light generating means. Alternatively the apparatus may be used to compare a previously made recording with a standard recording so that the differences therebetween can be displayed for immediate analysis as an aid in the diagnoses of blood, etc.

7 Claims, 3 Drawing Figures

SPECTROPHOTOMETRICAL APPARATUS FOR DETERMINING DOSING SUBSTANCES IN A LIQUID

This invention relates to spectrophotometrical methods and apparatus for using a single beam for determining the dosage of substances in a liquid. Recording spectrophotometers using a single or a double beam are known to the art and operate in the region from the ultraviolet to the near infra-red. Such instruments are capable of determining the concentration of substances which absorb light by means of calibrations with reference liquids. Some of these instruments include an oscillator which supplies a reference voltage for a comparator. The precision obtainable from such instruments is in the order of 5 percent which is sufficient for some determinations, but the accuracy of such apparatus does not enable the detection of traces of dosages of substances which are dissolved or suspended in a liquid. Further, when the spectrum of detected substances is obtained and when it is desired to compare that with a spectrum of the standard liquid, lengthy and complicated calculations are necessary. For example, in hospital laboratories improved spectrophotometers are currently in use; however, the results are determined with the use of calculating machines. Such machines are expensive and not always available for urgent analysis and their use demands specialized personnel. As a result, such spectrophotometers never allow for a precise diagnostic which can be immediately obtained in cases involving human poisoning by liquids.

In accordance with the present invention, the recording spectrophotometer method and apparatus using a single beam for determining the dosage of substances present in a liquid meets the most stringent requirements and enables a precise dosage detection of the traces of those substances which may be suspended or dissolved in a liquid. The present method and apparatus also provides a spectra recording of the desired substances and thereby offers a Doctor the possibility of making a diagnostic determination in a matter of minutes without the assistance of technicians or complex calculating apparatus.

The recording spectrophotometric apparatus of this invention embodies a light source composed of a gas discharge lamp capable of emitting luminous radiation in a spectrum from the ultraviolet to the near infra-red and an optical system capable of focusing such radiation on the grating of a monochromator, the slit width of which at its entry and exit determines the bandwidth of the spectrum. A cuvette is simultaneously illuminated with the spectrum of the liquid to be examined and a cuvette containing a standard liquid which produces two light beams differing only in their spectral content and their intensity by the amount of optical absorption. The entire spectrum is swept by a motor which modifies the slit width by varying the angle of incidence on the grating of the monochromator. The mechanical chopper alternatively intercepts each of the beams emitted from each of the cuvettes. A photoconductive sensor capable of receiving the luminous beams on its cathode and converting the luminous beams into electrical signals is received by an electrical circuit for recording the signals. The synchronous generator embodies a high frequency oscillator which is stabilized by a quartz crystal and by thermistors and includes frequency dividers for generating pulses capable of synchronizing the functioning of the above described components and of supplying a reference voltage to the circuitry.

The circuitry controlled by the frequency pulsations of the synchronous generator functions with a direct current component which eliminates drift inherent in frequency oscillators to produce a precision output signal in the order of one thousandth of a percent.

The electrical circuitry includes a Nand gate used as an inverter for receiving signals from the synchronous generator or a reference voltage. The circuitry also includes an electronic switch composed of two pairs of complementary transistors, an operational amplifier composed of an integrating circuit having high gain sensitivity, a voltage comparator comprising an integrated circuit module of high sensitivity, an intermediate amplifier composed of a logic circuit including Nand gates and a symmetrical amplifier, and a feedback circuit for controlling an operational amplifier.

The Nand gate inverter restores the voltage reference signal so that input signals and output signals thereof control the ratio A/B of the input signals or the inverted ratio B/A and the switching of the electronic switch. The complementary transistors of the electronic switch which are blocked or rendered conductive by means of the input and output signals of the inverter control the conductivity of two field-effect transistors. The two field-effect transistors control the operational amplifier so that signals A and B are alternatively applied to the input of the operational amplifier. The one-inverter input of the operational amplifier is set at zero potential and the voltage feedback, the value of which depends on the illumination thereon, is conducted through a photoconductive resistance. The photoconductive resistance preferably has a cadmium sulphide base. The comparator receives at one of its inputs the same signals emitted from the synchronous generator as those supplied to the Nand gate and the other input of the comparator receives the output signal of the operational amplifier and restores a voltage output proportional to the separation of the voltage supplied at the inputs of the comparator.

The intermediate amplifier receives one input of the four Nand gate logic and the output voltage of the comparator as well as the synchronous signals or an inverted signal for determining the operational mode B/A or A/B of a symmetrical amplifier which is used to amplify the logic signals and to apply such signals to the input of a field-effect transistor, the drain of which is connected to a luminescent diode. The light output of the diode is proportional to the output voltage of the comparator. The luminous diode is a p-n junction of gallium arsenide.

The operational amplifier feedback is obtained by modifying the photoconductive resistance inserted between the output and the inverter input of the amplifier as effected by the light emitted by the luminous diode so that the output signal of the amplifier represents the ratio between the reference voltage and the optical absorption difference between the sample and the standard. The output of the operational amplifier is independent of the components of the electronic circuitry and provides the same precision output as the reference voltage. The output signals of the amplifier are also capable of being recorded on magnetic tape.

The apparatus of this invention can function without optical elements, light sources, mechanical choppers, photoelectric sensors and also receives on one of the inputs of the electronic circuitry, a magnetic recording of the output signals previously obtained through an optical method. At the other input a programmed recording is received so that the signals obtained at the output of the amplifier operate a pen recorder which provides an immediate indication of the amount of substances in the examined liquid. The amount of the substances corresponds to the difference between the magnetic recording and the programmed recording.

A primary object of the present invention is to provide an improved method and apparatus for the spectrophotometric examination of substances suspended in a liquid.

The above object and features of the invention will become apparent from the following description taken in conjunction with the drawings, wherein.

Figure 1:
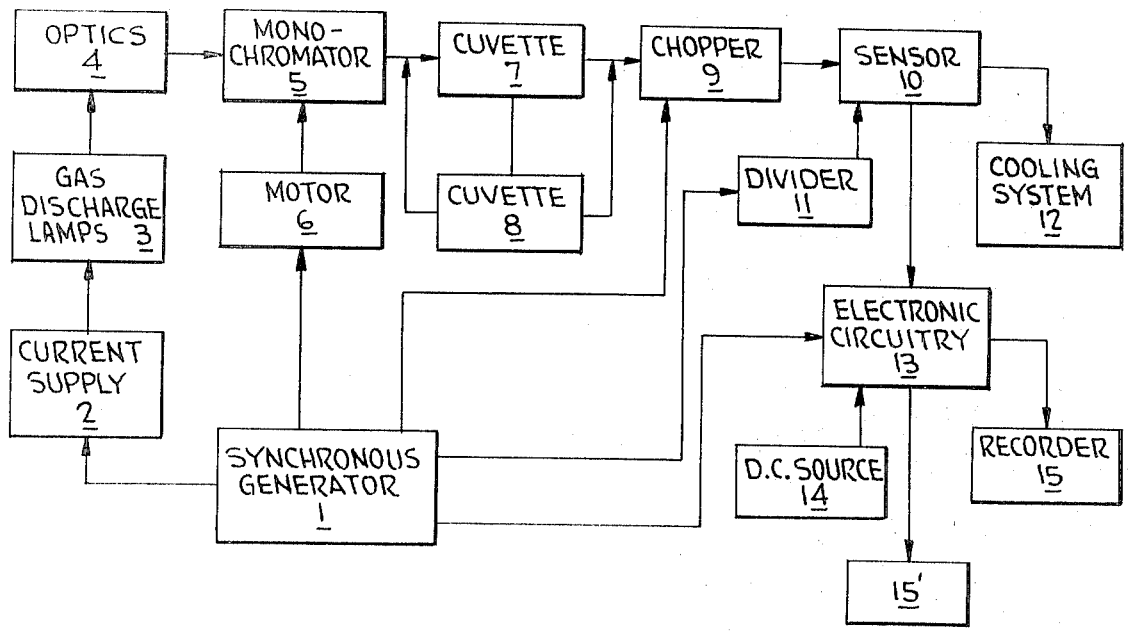
FIG. 1 represents a block diagram of the invention.

With reference to FIG. 1, synchronous generator 1, which is a high frequency oscillator of 1.2 MHz, is controlled by a quartz crystal stabilized with a thermistor and frequency dividers. It generates pulses capable of synchronizing the functioning of the principal components of the apparatus and also provides a reference voltage for the electronic circuitry. The synchronous generator is connected through a frequency divider to current supply 2 of two gas discharge lamps 3 capable of emitting luminous radiation covering the luminous spectrum from the ultraviolet to the near infra-red (2,000 to 10,000 A).

The lamps are thus operated in a pulsation mode at 480 Herz. The pulsed radiation traverses optical set-up 4 comprising a set of lenses at the focal point of which is mounted a monochromator 5 with a grating or a prism capable of receiving the focused beam. The spectral bandwidth of the monochromator, which is determined by the slit width at the entry and the exit thereof, allows the identification of molecular structures. The spectral radiation sweep, which is obtained by varying the incident angle of the focused beam, is assured by means of a motor device 6 connected to synchronous generator 1 through the frequency dividers capable of supplying an output of 120 Herz. If it is desired to examine liquids at a given wavelength, it is sufficient to cut off the supply to motor 6 and to manually vary the angle of incidence relative to the grating, that is, to orient the monochromator in the appropriate fashion.

A narrow band is thereby obtained enabling the identification of atomic specimen. A light emanating from the monochromator illuminates cuvette 7 containing the liquid to be examined and the cuvette having a standard liquid 8. The cuvettes 7 and 8 are in the form of glass tubing in the middle of which is inserted a cell of silica glass transparent to ultraviolet radiation and having four faces exposed to the radiation which are optically flat. The radiation is directed as a unique beam on both cells, after its passage through the liquids contained in the cells, and forms two beams which only differ in spectral composition and in intensity by the degree of absorption of the two liquids. As the composition of the standard liquid is known with precision it is only necessary to compare the spectrum of the unknown liquid to that of the standard. It follows that it is possible to obtain a complete analysis of a complex liquid in a matter of minutes. Analysis of an atomic or particular molecular specimen can be obtained in a matter of seconds.

The two pulsed light beams emanating from the cells are directed to a mechanical chopper 9 operated by a peristaltic pump (not shown). The mechanical chopper 9 is connected to the synchronous generator 1 through a frequency divider providing an output frequency of 120 Herz and alternatively interrupts the pulsed beam coming from cell 7 and the pulsed beam coming from cell 8. Each pulsed beam is alternatively provided to the cathode of photoelectric sensor 10 supplied with a pulsed voltage from the synchronous generator 1 through frequency divider 11 having an output frequency of 120 Herz. Preferably the cathode of the photosensitive element is constructed from antimony and cesium to which potassium and sodium have been added to extend the spectral sensitivity bandwidth. This sensor multiplies the number of produced electrons at the cathode subjected to the luminous intensity of the two pulsed beams and produces at its anode respective electrical signals of the two beams. To avoid a drift voltage of the signals because of heating, the temperature is maintained constant with a cooling system 12. The synchronous generator 1 provides one of the inputs of the electronic circuitry a frequency of 120 Herz to synchronize the circuit elements and also to another input a direct voltage current reference which is obtained by rectifying a 1.2 MHz signal. The supply also includes direct current sources 14. The absorption spectrum of the examined liquid which appears at the output of the electric circuitry may be recorded on magnetic tape or by a pen recorder 15 connected to the output.

According to a preferred use of the method and in accordance with the apparatus of the invention, the photosensitive device is disconnected and the optically recorded spectrum at 15 is compared to a pre-recorded program by utilizing both inputs of the electronic circuitry. The output of the electronic circuitry actuates pen recorder 15. The resulting recording will thus correspond to the difference between the peaks of the two absorption spectra and thus provides an immediate indication of the different constituting elements of the examined mixture.

Figure 2:
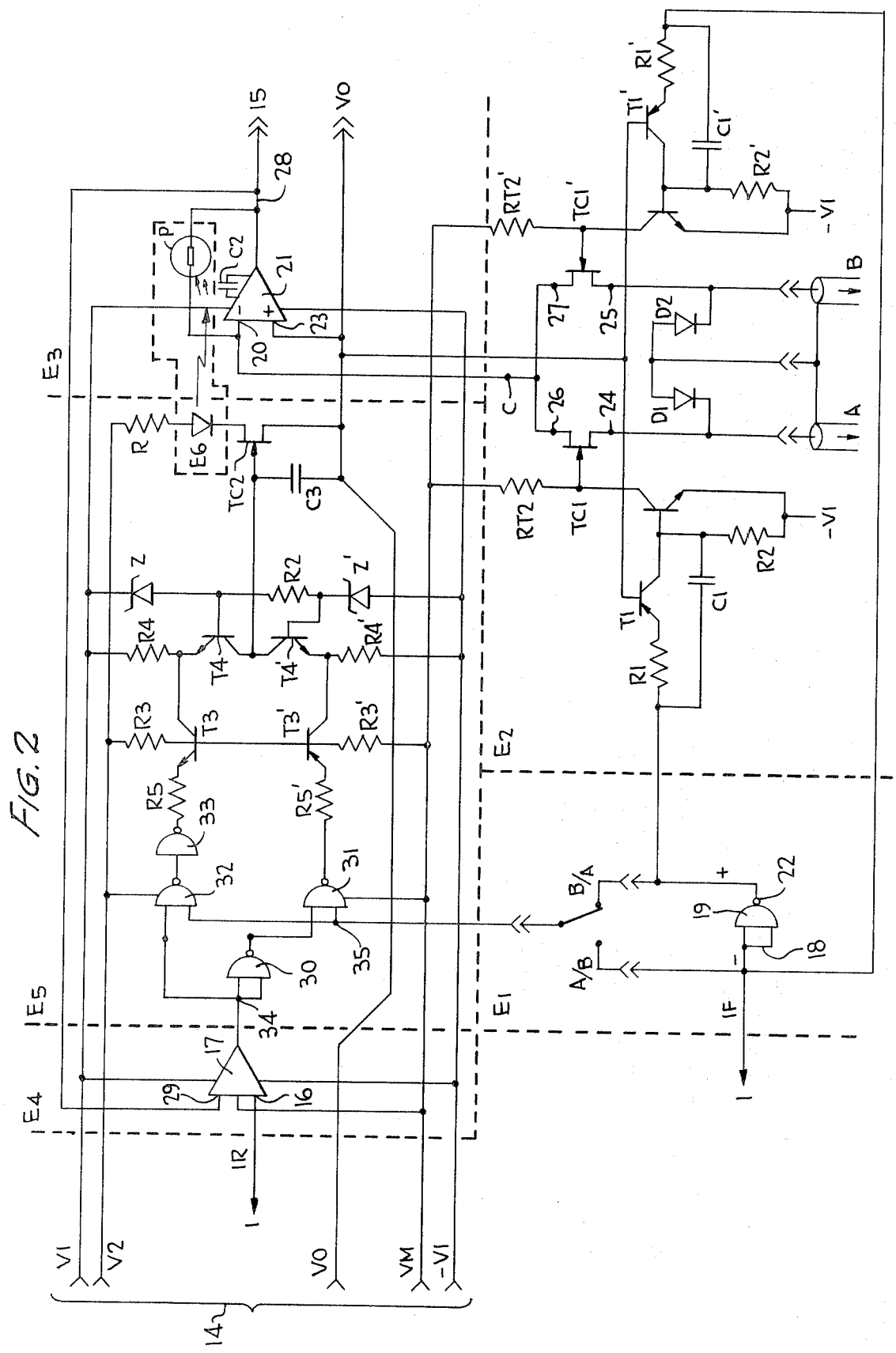
FIG. 2 represents a basic schematic of the electronic circuitry of the invention.

The electronic circuitry 13 connected to the photosensitive device for the pen or tape recording is represented by the schematic of FIG. 2. This schematic is subdivided by dotted lines dividing the circuit into six principal circuits designated with the symbols $E_1$ to $E_6$. The supply 14 embodies direct current supply sources V1, V2 and V3. The voltage VM represents the ground of supply and voltage V0 is ground or zero voltage. One of inputs 16 of comparator 17 located in the $E_4$ circuit of the schematic, is connected to synchronous generator 1 and receives therefrom a rectified voltage R1 of 1.2 MHz. The input 18 of Nand gate 19 inverter, in circuit $E_1$, receives from the frequency divider of synchronous generator 1 an input frequency F of 120 Herz. The electronic circuitry receives output electrical signals from the photosensitive device alternately from input A and input B in circuit $E_2$. These signals are fed to inverted input 20 of the operational amplifier 21 in circuit $E_3$. The output of amplifier 21 may be either magnetically or pen recorded with device 15.

Nand gate 19 inverts the signals of the synchronous generator 1 at its output 22 and the input and output signals of the inverter control the mode of the invention, that is, either ratio A/B or B/A, which signals are received on inputs A and B of the electrical circuitry. The Nand gate 19 also controls the switching of an electric switch represented within circuit $E_2$. That switch comprises two pairs of complementary transistors, either npn or pnp, T1, T2 and T1', T2', the circuits of which respectively contain capacitors C1, C1', R2 and R2' which are inserted as indicated in the schematic. The emitter of each transistor T2, T2' is at the same potential, namely, V1, and the emitters of transistors T1 and T1' are joined through resistors R1 and R1', respectively, at the output 22 and the input 18 of Nand gate 19. Transistors T1, T1' are mounted in a common base which is at zero potential and connected to input 23 of the operational amplifier. The two complementary pairs of transistors control the conduction stage of two-field effect transistors TC1 and TC1', which receive at their inputs 24, 25 the input signals from A and B. Their joint outputs 26, 27, through resistors RT1 and RT1', control input 20 (point C on the schematic). Inputs A and B are thus alternatively provided to the inputs of the amplifier, the latter being constituted by an integrated circuit of high fidelity and including output capacitor C2. Voltage feedback 28 is applied at the output of the amplifier to the input 20 thereof and is channeled through a photo-electric resistance P preferably of cadmium sulphide. The resistance of photoelectric resistance P is dependent on the light received by the component.

Comparator 17 in circuit $E_4$, which is composed of an integrated circuit of high reliability, receives at its input 29 the output signal 28 of amplifier 21 and restores a voltage proportional to the difference of the voltages applied on its input 16 and 29. An intermediate amplifier circuit $E_5$ is constructed of four Nand gates 30, 31, 32 and 33 and receives at input 35 the output voltage of comparator 17 and at the other input 35' the F signal of the synchronous generator 1, or the inverted signal through Nand gate 19. In this manner the operational mode B/A or A/B of the symmetrical amplifier is determined. The symmetrical amplifier comprises two pairs of transistors T3, T4 and T3', T4' connected as indicated in the schematic with respective resistances R3, R4, R5 and R3', R4' and R5'. The base of transistors T4, T4' is established through the network Z, RZ, Z' inserted between V1 and V2. Z and Z' are zener diodes and RZ is a resistance.

The function of the symmetrical amplifier is to amplify signals coming from the logic circuit and to apply such signals from output 36 to field-effect transistor TC2. The load is represented by a resistance R and a luminescent diode L of gallium arsenide. The output 36 is protected by an integrating capacitance C3. The light emitted by diode L is proportional to the output voltage of the comparator.

The operational amplifier feedback is obtained by variation of the photoconducting resistance P interposed between output 28 and input 20 which is influenced by the light emitted from diode L so that the value of the output signal of the operational amplifier is the ratio between the reference voltage 1R and the difference of the optical absorption between the sample and the standard.

As previously stated, the output can be recorded via recording means 15 and such a recording can be used as a signal source for one of the inputs A or B; the other input receiving programmed recorded signals when the photoelectric sensor is disconnected. It is to be noted that the input of the operational amplifier is protected against voltage overload by diodes D1 and D2 as indicated in the Figure.

The output of the electronic circuitry is independent of the variation of the circuit components and represents the same precision as the reference voltage. This output represents a precision of one thousandth of a percent which enables the detection of dosage traces of substances present in a liquid in minute amounts.

It is further noted that the electronic circuitry will function perfectly even if the voltage reference provided by the comparator is obtained from an alternating rectified voltage by means of a zener diode; however, in such a case the precision of the signal of the whole circuitry does not exceed 1 percent.

The photometric method and apparatus in accordance with the invention provides a great number of practical applications where the highest precision is essential such as the measurement of the output of blood flow, the determination of the blood composition, etc. Two such applications are described below:

EXAMPLE 1

Figure 3:
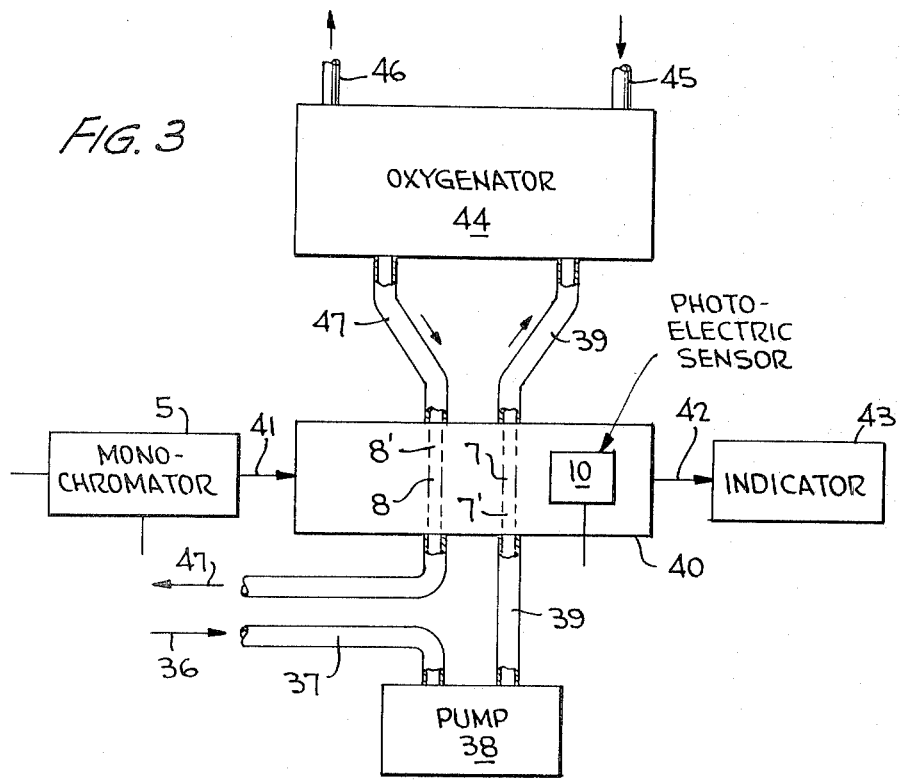
FIG. 3 shows a schematic of blood oxygenation apparatus embodying the spectrophotometric method in accordance with the invention.

It is known that in open heart surgery it is necessary to oxygenate in an artificial lung, blood circulating extra-corporally. There is no way at present by which it is possible to determine the efficiency of such an oxygenator. The surgeon who needs to know the oxygenation of the blood at the output has thus no means to ascertain immediately the oxygen content of the blood. The method in accordance with this invention provided by the oxygenation equipment thereof provides such information immediately with a very high precision (FIG. 3). The venous blood coming from the patient who undergoes surgery is channeled through flexible tubing 37 to pumping system 38 from which it flows through flexible tubing 39 toward one of cuvettes 7 of the apparatus illustrated in FIG. 1. The cuvette is incorporated in an appropriate tubing 7'. Cuvettes 7 and 8, with their appropriate tubing 7' and 8' and the photoelectric sensor 10 are conveniently arranged in an enclosure 40 which receives the pulsed light beam 41 of monochromator 5. The output of the electronic circuitry illustrated by arrow 42 is visually displayed on indicator 43. The blood flowing through cuvettes 7, 7' reaches oxygenator 44 where it is oxygenated with oxygen penetrating through entry 45. The unused oxygen escapes through opening 46. The oxygenated blood flows through cuvettes 8, 8' where it is examined simultaneously with venous blood 36 and flows back to the patient. Regulating the monochromator in accordance with the characteristic color of the oxyhemoglobin, the surgeon can immediately determine the percentage of oxygen simply by examining display 43. Then by changing the wavelength of the monochromator he can also evaluate the percentage of carboxyhemoglobin and thus regulate the inflow of the necessary oxygen.

EXAMPLE 2

To ascertain the ratio of the percentages of sodium and potassium, for example in the blood of a patient, while knowing the ratio of normal blood, the Doctor takes a minimum quantity of blood of the patient and compares it to normal blood by means of the method of the invention which includes cuvettes 7, 7' and 8, 8' as illustrated in FIG. 3. In one minute of operation of the apparatus the Doctor first records the 7,000 absorption peaks of the blood sample present in the cuvettes. The Doctor then disconnects the photoelectric sensor and connects the electronic circuitry to one of the inputs A or B of the magnetic recording which has just been obtained. He connects to the other input a magnetic recording of the spectral absorption of blood containing the normal ratio of sodium to potassium. He then starts a pen recorder (FIG. 1) which inscribes immediately the difference between the normal blood and the examined blood. The Doctor can then make his diagnosis.

I claim:

1. Spectrophotometric apparatus for determining substances present in a liquid, comprising:

means for emitting luminous radiation in a range from ultraviolet to near infra-red;

a monochromator including a grating providing a variable slit width for determining the bandwidth of said luminous radiation;

means for focusing said luminous radiation onto the grating of said monochromator;

means for exposing the liquid to be examined to said radiation and exposing a known liquid to said radiation for respectively generating first and second spectrums;

means for sweeping the spectrum of said luminous radiation by varying the grating of said monochromator;

means for alternatively chopping said first and second spectrums;

means for analyzing said chopped first and second spectrums to determine the difference therebetween and including an operational amplifier for alternately amplifying said first and second spectrums, said operational amplifier including a feedback circuit with a light generating element for generating a light output proportional to the difference between said first and second spectrums and a light sensitive element responsive to the light output of said light generating means for controlling the resistance of said feedback circuit; and means for recording the output of said operational amplifier.

2. Spectrophotometric apparatus as in claim 1 wherein said means for analyzing further includes first and second inputs, means for switching the input of said operational amplifier to either said first or second input, and means for generating synchronizing pulses to control the switching of said first and second inputs and the operation of said operational amplifier.

3. Spectrophotometric apparatus as in claim 2 wherein said means for analyzing further includes means for comparing the output of said operational amplifier with a reference voltage and said means for generating light is responsive to the output of said means for comparing.

4. Spectrophotometric apparatus as in claim 3 wherein said means for switching includes an inverter for generating the ratio of the first input to the second input and the ratio of the second input to the first input and means for switching either of said ratios to said means for comparing.

5. Spectrophotometric apparatus as in claim 4 wherein said means for switching comprises a pair of symmetrically connected field-effect transistors each having inputs respectively responsive to the input and output of said inverter whereby said first and second inputs are alternatively applied to the input of said operational amplifier.

6. Spectrophotometric apparatus as in claim 5 wherein said means for comparing includes a symmetrical amplifier and a logic circuit responsive to the output of said symmetrical amplifier and the input and output of said inverter for determining the difference between said first and second inputs.

7. Spectrophotometric apparatus as in claim 2 wherein said first input receives electrical signals representing recorded output of said operational amplifier and said second input receives electrical signals representing the composition of a known liquid, whereby the output of said operational amplifier indicates the difference between said first and second inputs.

* * * * *